United States Patent
Pozzetti

[11] 3,768,010
[45] Oct. 23, 1973

[54] DEVICE FOR DETECTING IRREGULARITIES IN THE SHAPE OF A WORKPIECE DURING MACHINING

[75] Inventor: Mario Pozzetti, Bologna, Italy

[73] Assignee: Finike Italiana Marposs-Soc. in Accomandita Semplice di Mario Possati & Co., Bologna, Italy

[22] Filed: Dec. 21, 1971

[21] Appl. No.: 210,445

[30] Foreign Application Priority Data
Jan. 1, 1971   Italy ................................ 3322 A/71

[52] U.S. Cl. .......................... 324/103 P, 33/174 Q
[51] Int. Cl. ...................... G01r 19/16, G01r 7/00
[58] Field of Search .................... 324/103 P, 103 R, 324/130; 33/174 Q

[56] References Cited
UNITED STATES PATENTS
3,593,133   7/1971   Wisner ............................ 324/103 R
3,525,040   8/1970   Rolfe .............................. 324/103 R Primary Examiner—Rudolph V. Rolinec
Assistant Examiner—Ernest F. Karlsen
Attorney—Richard K. Stevens et al.

[57] ABSTRACT

Apparatus for detecting irregularities in the shape of a workpiece during machining, comprising a first capacitive memory means for memorizing the maximum dimension of the workpiece at an adjustable predetermined time, second capacitive memory means for memorizing the minimum dimension of the workpiece at the same time and means for determining the difference between the memorized maximum and minimum dimensions.

4 Claims, 4 Drawing Figures

DEVICE FOR DETECTING IRREGULARITIES IN THE SHAPE OF A WORKPIECE DURING MACHINING

The present invention relates to a device for detecting irregularities in the shape of a workpiece during machining, comprising a measuring member adapted to detect at any moment the size of the workpiece being machined.

In particular this device is adapted to be used on grinders. With ordinary devices for measuring the dimensions of parts during machining, the average dimension of said parts is determined. Normally the irregularities are made visible by the oscillation of the pointer of the measuring instrument which, in addition to being tiring for the operator, obviously gives only a very approximate indication of these irregularities. Very frequently, particularly when interconnections must be effected, in addition to the average diameter, it is of great importance to know with good approximation the size of the irregularities of the workpiece, since they may make these interconnections extremely difficult. With a knowledge of these irregularities, one can control the cycle of the machine in such a manner as to reduce them to within predetermined limits.

The technical problem which the present invention proposes to solve is that of providing a device for determining and indicating the values of the irregularities of a workpiece during a maching cycle which is simple, inexpensive and highly trustworthy.

This probelm is solved by the device in accordance with the invention which is characterized by first memory means for memorizing the maximum dimension of the workpiece at an adjustable predetermined time, second memory means for memorizing the minimum dimension of the workpiece at the same time, and means for determining the difference between said maximum and said minimum.

The following represents a preferred embodiment of the invention, given by way of illustration and not of limitations, with reference to the accompanying drawings in which.

Figure 1:
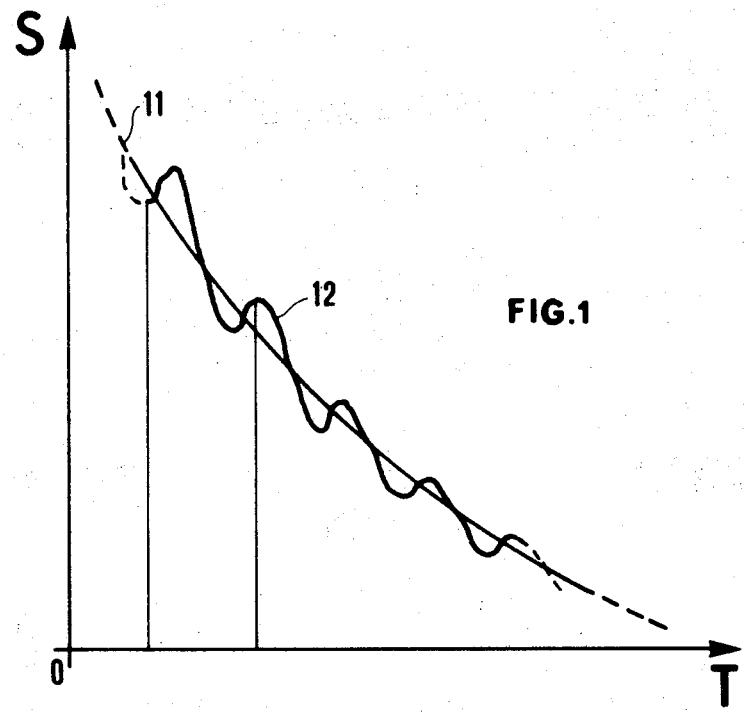
FIGS. 1 and 2 show a basic operating diagram of the device in accorance with the invention.

Referring to FIG. 1, the abscissa represents the time T and the ordinate represents the excess metal S of the part being machined.

Figure 2:
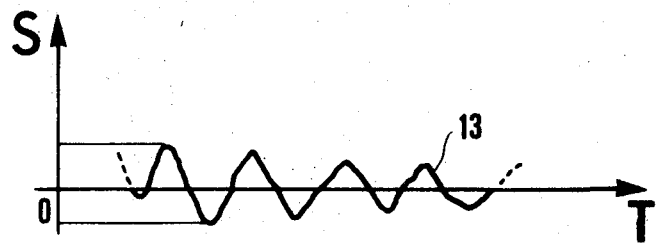

The excess metal S has on the average a decreasing course, as indicated by the curve 11, the slope of which depends on the speed of removal. The actual shape of the workpiece is superimposed on the theoretical curve 11 and a curve 12 is obtained which oscillates around the curve 11; the differences between the curves 11 and 12 constitute the irregularities of the workpiece being machined (FIG. 2).

Figure 3:
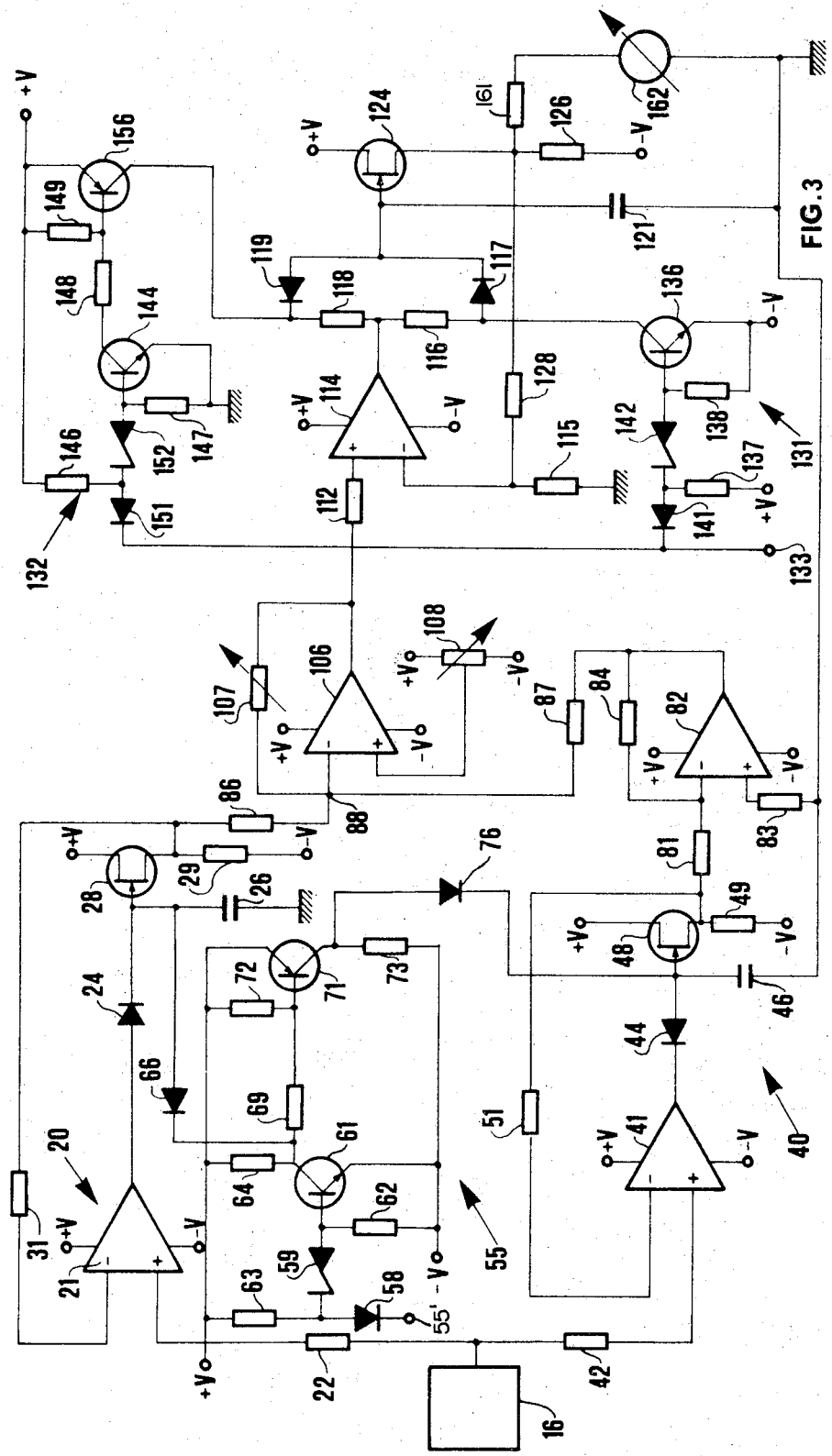
FIG. 3 shows a device for the determination of the irregularities in shape of the workpiece, in accordance with the invention.

The determination of the size of these irregularities is effected by the circuit shown in FIG. 3. It comprises a high-pass filter 16 having at its input 16' the signal coming from the measuring member and capable of permitting the passage only of variations of the signal with respect to the average value. A signal which substantially corresponds to the amplitude of the irregularities of the workpiece will appear at the output of the filter 16, as shown in FIG. 2 by the curve 13.

The signal at the output of the filter 16 is fed to the input of a circuit 20 capable of memorizing the maximum value of said signal. The circuit 20 comprises an operational amplifier 21 fed by the voltages +V and −V, the output signal from filter 16 is fed through resistor 22 to the input of circuit 20, the output of which is connected through a diode 24 arranged to permit only the passage of positive voltages to charge a capacitor 26. The voltage appearing at the junction of capacitor 26 and diode 24 is fed to the input of FET 28 fed by the voltages +V and −V, biased by a resistor 29 and connected in such a manner as to operate as a cathode follower. The output of the FET 28 is applied to the negative input of the amplifier 21 through a feedback resistor 31 to assure a unit gain for the network formed by the amplifier 21 and the FET 28.

When the signal at the input to the amplifier 21 increases, this increased value charges the capacitor 26 through diode 24 which is forward biased. If, however, the signal decreases, then the negative input is, in absolute value, greater than the value present at the positive input, since the capacitor 26 is charged to the preceding voltage value.

The output of the amplifier 21 then becomes negative and the diode 24 becomes reverse biased. The capacitor 26 in this way retains the charge which had previously accumulated.

The output of the filter 16 is also fed to the input of a circuit 40 which is capable of memorizing the minimum value of said signal. The circuit 40 comprises an operational amplifier 41 fed by the voltages +V and −V. An output signal from filter 26 is fed to the positive input of amplifier 41 through resistor 42; the output of amplifier 41 is connected through diode 44, so connected to pass only negative voltages appearing across it, to control the charging of capacitor 46. The voltage appearing at the junction of capacitor 46 and diode 44 is applied to the input of FET 48 fed by the voltages +V and −V, biased by a resistor 49, and connected so as to function as a cathode follower. The output of the FET 48 is applied to the negative input of the amplifier 41 through a feedback resistor 51 to assure a unit gain for the network formed by the amplifier 41 and the FET 48.

When the signal at the input to the amplifier 41 decreases the output thereof also decreases, and this decreased value, through the diode 40 which is now forward biased, appropriately changes the value of the charge on the capacitor 46. If, however, the signal increases, then the negative input becomes, in absolute value, less than the value present at the positive input since the capacitor 46 is charged to the preceding voltage value. The output of the amplifier 41 then becomes positive and the diode 44 becomes reverse biased. The capacitor 46 in this way retains the charge which has been previously accumulated.

The two capacitors 26 and 46 are controlled by a circuit 55. A signal 56 (FIG. 4), obtained from a known logical control unit (not shown) connected to input 55' of circuit 55, is applied through a diode 58 and a Zener diode 59 to the base of a transistor 61 fed by the voltages +V and −V and biased by the resistors 62, 63 and 64. The voltage present on the collector of the transistor 61 is fed, through a diode 66, to the capacitor 26.

The collector of the transistor 61 is furthermore connected through a resistor 69 to the base of a transistor 71 which is fed in turn by the voltages +V and −V and is biased by the resistors 72 and 73. The collector of the transistor 71 is connected through diode 76 to capacitor 46.

When the signal 56 is zero, the transistor 61 is reverse biased and its collector is at a positive voltage so as to reverse bias the diode 66. the capacitor 26 therefore can not discharge by the path defined by diode 66 and transistor 61. When, however, the signal 56 becomes positive, the transistor 61 becomes saturated and its collector voltage becomes practically equal to −V, making the diode 66 highly conductive. The capacitor 26 is thus able to discharge through diode 66 and transistor 61 to −V.

When the transistor 61 is reverse biased, the transistor 71 also becomes reverse biased; its collector is therefore at a negative voltage such as to reverse bias the diode 76, thereby preventing capacitor 46 from discharging. When the transistor 61 is at saturation, the transistor 71 also becomes saturated and its collector voltage becomes substantially equal to +V so that the diode 76 becomes forward biased and highly conductive. The capacitor 46 can therefore be discharged by +V through the path formed by transistor 71 and diode 76.

The output of the FET 48 is fed to the input of an operation amplifier 82 through a resistor 81; amplifier 82 is fed by the voltages +V and −V and biased by a resistor 83; the output of amplifier 82 fed back to its input by a resistor 84. The amplifier 82 is therefore able to invert the signal at the input.

The outputs of the FET 28 and of the amplifier 82 are connected through resistors 86 and 87, respectively, to a node 88 where the output signals from FET's 28 and 48 are substantially summed, the negative output signal from FET 48 having been inverted by the amplifier 82.

The node 88 is connected to the input of an operational amplifier 106 fed by the voltages +V and −V and having a gain which is adjustable by a variable feedback resistor 107 so as to regulate the sensitivity of the system. The variable output of a potentiometer 108, connected across the voltages +V and −V, is applied to the positive input of amplifier 106.

By appropriately regulating this voltage, a balancing is effected between the various circuits so as to have a zero output from the amplifier 106 when the signal coming from the filter 16 is zero.

The output of the amplifier 106 is introduced, through a resistor 112, to the positive input of an operational amplifier 114 fed by the voltages +V and −V and biased by a resistor 115.

The output of the amplifier 114 is fed through two paths one consisting of a resistor 116 in series with a diode 117 and the other of a resistor 118 in series with a diode 119, to a capacitor 121 which is thus charged to the most current value of the difference between the two maxima determined by the circuits 20 and 40 when the two diodes 117 and 119 are able to conduct.

The voltage value present on the capacitor 121 is applied to the input of FET 124 which is connected between the voltages +V and −V and biased by a resistor 126. The output of the FET 124 is applied, through a feedback resistor 128, to the input of the amplifier 114 so as to make certain that the latter has a gain equal to one.

Figure 4:
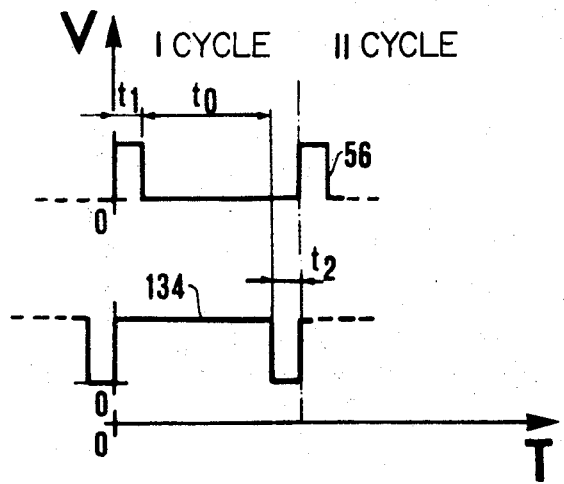
FIG. 4 shows a diagram of the operating cycle of the device of FIG. 3.

The conduction of the diodes 117 and 119 is controlled by two circuits 131 and 132, to the common input 133 of which is applied a signal 134 (FIG. 4). The circuit 131 comprises a transistor 136 fed by the voltages +V and −V, biased by the resistors 137 and 138, and with its collector connected to the anode of the diode 117. The signal 134 is applied to the base of the transistor 136 through a diode 141 and a Zener diode 142. The circuit 132 comprises a transistor 144 fed by the voltage +V and biased by the resistors 146, 147, 148, and 149. The signal 134 is applied the base of the transistor 144 through a diode 151 and a Zener diode 152. The collector of the transistor 144 is connected, through the resistor 148, to the base of a transistor 156 fed by the voltage +V. The collector of the transistor 156 finally is connected to the cathode of the diode 119.

The signal 134 is normally positive so that the transistors 136 and 144 are normally saturated. The collector of the transistor 136 is accordingly at a voltage level close to −V so as to maintain the diode 117 reverse biased. Similarly the collector of the transistor 144 is at a voltage level such as to saturate the transistor 156 whose collector is accordingly at a voltage level close to +V. The diode 119 is then reverse biased. As both the diodes 117 and 119 are reverse biased, the signal at the output of the amplifier 114 cannot pass to the capacitor 121; thus the value of the charge on capacitor 121 remains unchanged.

When the signal 134 during the time $t_2$ drops to zero, the transistors 136 and 144 become reverse biased, as does the transistor 156. The voltage at the anode of the diode 117 therefore becomes positive so that diode 117 becomes conductive; similarly the voltage at the cathode of the diode 119 is made negative so that the diode 119 also becomes conductive.

As both the diodes 117 and 119 are conductive, the capacitor 121 is charged to the voltage value present at the output of the amplifier 114.

The output of the FET 124 is applied through a resistor 161 to a measuring instrument 162 which is thus able to give an indication as to the amount of the irregularities of the surface of the workpiece being machined.

Summarizing, the device operates as follows:

At the start of the cycle at the time $t_1$, the signal 56, in the manner described above, zeroes the two memory capacitors 26 and 46. At the end of the time $t_1$, the two circuits 20 and 40 are able to memorize the maximum signal and the minimum signal respectively coming from the filter 16 at the time $t_0$.

The output signal of the FET 48 is inverted by the amplifier 82 and made positive. Thereupon it is added to the signal coming from the FET 28 at the node 88 at which therefore there is the value of the maximum excursion of the signal.

At the time $t_2$, the signal 134 permits this signal to pass to the capacitor 121 which is thus charged to the new value to be memorized. This value is indicated by the measuring instrument 162.

It is obvious that various changes with additions or substitutes of parts may be made without thereby going beyond the scope of the invention.

For example, the output of the FET 124, instead of being sent to an indicating instrument, can be sent to a device for controlling the cycle of the grinder so as to stop it when the irregularities of the workpiece have dropped below a predetermined value.

What is claimed is:

1. An apparatus for operating on signals representing measured irregularities in the shape of a workpiece being machined, comprising:

first and second memory means for respectively storing signals representing the measured maximum and minimum dimensions of said workpiece;

difference signal means coupled to said first and second memory means for providing a signal representing the difference between said measured maximum and minimum dimensions;

further storage means for storing the output of said difference signal means;

zeroing means for cyclically zeroing said first and second memory means and for thereafter permitting them to store further signals representing further measured maximum and minimum dimensions of said workpiece; and further zeroing means for cyclically controlling the electrical connection between said difference signal means and said further storage means and for electrically connecting said difference signal means and said further storage means to each other at a preset time after a set of maximum and minimum dimensions of said workpiece have been measured and stored in said first and second memory means.

2. The apparatus according to claim 1, further comprising high-pass filter means coupled to the inputs of said first and second memory means for passing substantially only the portion of a measurement signal which corresponds to the irregularities of the workpiece being measured.

3. The apparatus according to claim 2, further comprising a pair of rectifying elements coupled in parallel and interposed between said difference signal means and said further storage means, said further zeroing means being coupled to said rectifying elements for controlling the electrical biasing thereof.

4. The apparatus according to claim 3, further comprising indicating means coupled to the output of said further storage means for indicating the value of the difference between said measured maximum and minimum dimensions.

* * * * *

UNITED STATES PATENT OFFICE
CERTIFICATE OF CORRECTION

Patent No. 3,768,010         Dated October 23, 1973

Inventor(s) MARIO POZZETTI

It is certified that error appears in the above-identified patent and that said Letters Patent are hereby corrected as shown below:

[73]  Assignee incorrect, "Possati & Co.," should be ---Possati & C.---.

[30]  "Jan. 1,1971" should be ---Jan. 28, 1971---.

Column 1, line 31, correct spelling of ---problem---.

Column 1, line 44, correct spelling of ---accordance---.

Column 2, line 50, cancel "40" and insert ---44---.

Column 3, line 9, capitalize ---The--- after "66.".

Column 3, lines 28, 29, cancel "operation" and insert ---operational---.

In the Drawing, Figure 3, 

Signed and sealed this 16th day of July 1974.

(SEAL)
Attest:

McCOY M. GIBSON, JR.
Attesting Officer

C. MARSHALL DANN
Commissioner of Patents